US012801696B2

(12) United States Patent
Mishra et al.

(10) Patent No.: US 12,801,696 B2
(45) Date of Patent: Nov. 17, 2026

(54) METHODS AND APPARATUS FOR GENERATING TRAINING DATA TO TRAIN MACHINE LEARNING BASED MODELS

(71) Applicant: Walmart Apollo, LLC, Bentonville, AR (US)

(72) Inventors: Abhishek Mishra, Bengaluru (IN); Ashish Gupta, Bangalore (IN); Somedip Karmakar, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 984 days.

(21) Appl. No.: 17/710,225

(22) Filed: Mar. 31, 2022

(65) Prior Publication Data

US 2023/0076083 A1 Mar. 9, 2023

Related U.S. Application Data

(60) Provisional application No. 63/241,784, filed on Sep. 8, 2021.

(51) Int. Cl.

| | |
|---|---|
| ***G06F 18/22*** | (2023.01) |
| ***G06F 18/214*** | (2023.01) |
| ***G06F 18/2321*** | (2023.01) |

(52) U.S. Cl.
CPC ...... *G06F 18/2148* (2023.01); *G06F 18/2155* (2023.01); *G06F 18/22* (2023.01); *G06F 18/2321* (2023.01)

(58) Field of Classification Search
CPC .... G06N 20/00; G06F 18/248; G06F 18/2321
See application file for complete search history.

(56) References Cited

U.S. PATENT DOCUMENTS 6,049,797 A * 4/2000 Guha .................... G06F 18/23 707/999.005
2019/0377819 A1 12/2019 Filliben et al.
(Continued)

OTHER PUBLICATIONS

Zeng, Hua-jun et al. "CBC Clustering based Text Classification Requiring Minimal Labeled Data" 2003 [Online] Downloaded Mar. 3, 2025 https://ieeexplore.ieee.org/stamp/stamp.jsp?tp=&arnumber=1250951 (Year: 2003).*
(Continued)

*Primary Examiner* — Ben M Rifkin
(74) *Attorney, Agent, or Firm* — Morgan, Lewis & Bockius LLP; Manita Rawat

(57) ABSTRACT

Systems and methods for generating training data, and training machine learning models with the generated training data, are disclosed. In some examples, a computing device obtains, from a data repository, training data, wherein the training data comprises labelled samples and unlabeled samples. The computing device generates clusters of the training data based on one or more corresponding attributes of the training data. Further, the computing device determines a distance metric between positively labelled samples and unlabeled samples within each cluster, and generates, for each of the clusters, a plurality of sub-clusters based on the determined distance metrics. The computing device also determines, from each of the plurality of sub-clusters, one or more of the unlabeled samples based on a corresponding reward value and a corresponding sampling rate value. The computing device may train a machine learning model with the determined unlabeled samples from each of the plurality of sub-clusters.

17 Claims, 14 Drawing Sheets

(56) References Cited

U.S. PATENT DOCUMENTS

| | | | |
|---|---|---|---|
| 2021/0065186 | A1 | 3/2021 | Kramme et al. |
| 2021/0081963 | A1 | 3/2021 | Patel |

OTHER PUBLICATIONS

Mohammed, Roweida, Jumanah Rawashdeh and Malak Abdullah. "Machine Learning with Oversampling and UNdersamping Techniques: Overview Study and Experimental Results" 2020 [Online] Downloaded Apr. 3, 2025 https://ieeexplore.ieee.org/stamp/stamp.jsp?tp=&arnumber=9078901&tag=1 (Year: 2020).*

Han, Kay et al. "Autoencoder Inspired Unsupervised Feature Selection" 2018 [Online] Downloaded Apr. 3, 2025 https://ieeexplore.ieee.org/stamp/stamp.jsp?tp=&arnumber=8462261 (Year: 2018).*

Forestier, Germain and Cedric Wemmert. "Semi-supervised learning using multiple clusterings with limited labeled data" 2016 [ Online] Downloaded Aug. 25, 2025 https://www.sciencedirect.com/science/article/pii/S0020025516302936 (Year: 2016).*

Guo, Lie et al. "Joint exploring of risky labeled and unlabeled samples for safe semi-supervised clustering" Mar. 2021 [Online] Downloaded Aug. 25, 2025 https://www.sciencedirect.com/science/article/pii/S0957417421002372 (Year: 2021).*

* cited by examiner

520

700

| Categories (702) | Description (704) |
| --- | --- |
| **Damaged_GNR** | Goods Not Returned and Damaged returns Risk |
| **Refund_Amt_Cnt_Rec** | Refund Value, Volume and Recency Risk |
| **Risky_Cancellation** | Cancellation Risk |
| **Collusion** | Collusion with Drivers Risk |

FIG. 7A

750

| Categories (702) | Explore Rewards (752) | Explore Sampling Ratio (762) |
|---|---|---|
| **Damaged_GNR** | R_EXPR_Damaged_GNR | SR_EXPR_Damaged_GNR |
| **Refund_Amt_Cnt_Rec** | R_EXPR_Refund_Amt_Cnt_Rec | SR_EXPR_Refund_Amt_Cnt_Rec |
| **Risky_Cancellation** | R_EXPR_Risky_Cancellation | SR_EXPR_Risky_Cancellation |
| **Collusion** | R_EXPR_Collusion | SR_EXPR_Collusion |

760

| Categories (702) | Exploit Rewards (752) | Exploit Sampling Ratio (762) |
|---|---|---|
| **Damaged_GNR** | R_EXPT_Damaged_GNR | SR_EXPT_Damaged_GNR |
| **Refund_Amt_Cnt_Rec** | R_EXPT_Refund_Amt_Cnt_Rec | SR_EXPT_Refund_Amt_Cnt_Rec |
| **Risky_Cancellation** | R_EXPT_Risky_Cancellation | SR_EXPT_Risky_Cancellation |
| **Collusion** | R_EXPT_Collusion | SR_EXPT_Collusion |

FIG. 7B

METHODS AND APPARATUS FOR GENERATING TRAINING DATA TO TRAIN MACHINE LEARNING BASED MODELS

CROSS-REFERENCE TO RELATED APPLICATIONS

This application claims priority to U.S. Provisional Application Ser. No. 63/241,784, filed on Sep. 8, 2021 and entitled "METHODS AND APPARATUS FOR GENERATING TRAINING DATA TO TRAIN MACHINE LEARNING BASED MODELS," and which is hereby incorporated by reference in its entirety.

TECHNICAL FIELD

The disclosure relates generally to machine learning based processes and, more specifically, to generating training data to train machine learning models.

BACKGROUND

Machine learning models are employed by computing systems across a variety of applications for various reasons. For example, in the retail space, computing systems may apply machine learning models to generate recommendations, such as item advertisement recommendations. For example, computing systems may apply machine learning models to generate item advertisements for display to customers on retailer websites.

Machine learning models may also be employed to detect fraudulent activity. For example, computing systems may apply machine learning models to detect fraudulent payment forms. For instance, a customer may attempt to purchase an item using a payment form, such as a credit card, belonging to another person. As another example, computing systems may apply machine learning models to detect fraudulent returns. For instance, customers may attempt to return items to a retailer that were not originally purchased from the retailer.

In these and other examples, however, the machine learning models can suffer from being insufficiently trained, which may lead to higher error rates (e.g., false positives, false negatives). This may be more prevalent for rare event scenarios when there is littler or not enough data to label and train the machine learning models with. As such, there are opportunities to address the training of machine learning models in the retail arena as well as more generally.

SUMMARY

The embodiments described herein are directed to generating training data, such as labelled training data, to train machine learning models. For example, known cases of fraudulent activity may be sparse. Thus, the amount of training data characterizing fraudulent activity may be limited or less than preferable. As such, machine learning models may have insufficient training data to learn from. Moreover, machine learning models may be unable to recognize new patterns of fraudulent activity, at least because they were not trained to recognize such new patterns. The embodiments described herein, however, may address these and other issues.

Although the embodiments may be described with respect to detecting fraudulent activity in the retail space, the described processes can be applied, in at least other examples, across other applications as well.

In accordance with various embodiments, exemplary systems may be implemented in any suitable hardware or hardware and software, such as in any suitable computing device. For example, in some embodiments, a system includes a database and a computing device communicatively coupled to the database. The computing device is configured to obtain, from the database, training data, wherein the training data comprises positively labelled samples and unlabeled sample. The computing device is also configured to generate clusters of the training data based on one or more corresponding attributes of the training data, where each cluster includes a portion of the positively labelled samples and a portion of the unlabeled samples. Further, the computing device is configured to determine a distance metric between the portion of the positively labelled samples and the portion of the unlabeled samples associated with each cluster. The computing device is also configured to generate, for each of the clusters, a plurality of sub-clusters based on the determined distance metrics. Further, the computing device is configured to determine, from each of the plurality of sub-clusters, one or more of the unlabeled samples based on a corresponding reward value and a corresponding sampling rate value. The computing device is also configured to store the determined unlabeled samples from each of the plurality of sub-clusters in the database.

In some embodiments, a method is provided that includes obtaining, from a database, training data, wherein the training data comprises positively labelled samples and unlabeled samples. The method also includes generating clusters of the training data based on one or more corresponding attributes of the training data, where each cluster includes a portion of the positively labelled samples and a portion of the unlabeled samples. The method further includes determining a distance metric between the portion of the positively labelled samples and the portion of the unlabeled samples associated with each cluster. The method also includes generating, for each of the clusters, a plurality of sub-clusters based on the determined distance metrics. Further, the method includes determining, from each of the plurality of sub-clusters, one or more of the unlabeled samples based on a corresponding reward value and a corresponding sampling rate value. The method also includes storing the determined unlabeled samples from each of the plurality of sub-clusters in the database.

In yet other embodiments, a non-transitory computer readable medium has instructions stored thereon, where the instructions, when executed by at least one processor, cause a computing device to perform operations that include obtaining, from a database, training data, wherein the training data comprises positively labelled samples and unlabeled samples. The operations also include generating clusters of the training data based on one or more corresponding attributes of the training data, where each cluster includes a portion of the positively labelled samples and a portion of the unlabeled samples. The operations further include determining a distance metric between the portion of the positively labelled samples and the portion of the unlabeled samples associated with each cluster. The operations also include generating, for each of the clusters, a plurality of sub-clusters based on the determined distance metrics. Further, the operations include determining, from each of the plurality of sub-clusters, one or more of the unlabeled samples based on a corresponding reward value and a corresponding sampling rate value. The operations also include storing the determined unlabeled samples from each of the plurality of sub-clusters in the database.

In some embodiments, a system includes a database and a computing device communicatively coupled to the database. The computing device is configured to obtain, from the database, training data, wherein the training data includes labelled training data and unlabeled training data. The computing device is also configured to cluster the training data into clusters based on one or more corresponding attributes (e.g., predefined attributes) of the training data. The computing device is further configured to associate the training data within each cluster with one of a plurality of groups based on determining a distance metric between the positively labelled training data and the other training data within each cluster. The computing device is also configured to determine, from each of the plurality of groups, one or more samples based on a corresponding reward value and a sampling rate value for each of the plurality of groups. Further, the computing device is configured to store the determined samples from each of the plurality of groups in the database for labelling. In some examples, the determined samples are labelled, and the computing device is configured to obtain the labelled samples, and train a machine learning model with the labelled samples.

In some embodiments, a method is provided that includes obtaining, from a database, training data, wherein the training data includes labelled training data and unlabeled training data. The method also includes clustering the training data into clusters based on one or more corresponding attributes of the training data. The method further includes associating the training data within each cluster with one of a plurality of groups based on determining a distance metric between the positively labelled training data and the other training data within each cluster. The method also includes determining, from each of the plurality of groups, one or more samples based on a corresponding reward value and a sampling rate value for each of the plurality of groups. Further, the method includes storing the determined samples from each of the plurality of groups in the database for labelling. In some examples, the determined samples are labelled, and the method further includes obtaining the labelled samples, and training a machine learning model with the labelled samples.

In yet other embodiments, a non-transitory computer readable medium has instructions stored thereon, where the instructions, when executed by at least one processor, cause a computing device to perform operations that include obtaining, from a database, training data, wherein the training data includes labelled training data and unlabeled training data. The operations also include clustering the training data into clusters based on one or more corresponding attributes of the training data. The operations further include associating the training data within each cluster with one of a plurality of groups based on determining a distance metric between the positively labelled training data and the other training data within each cluster. The operations also include determining, from each of the plurality of groups, one or more samples based on a corresponding reward value and a sampling rate value for each of the plurality of groups. Further, the operations include storing the determined samples from each of the plurality of groups in the database for labelling. In some examples, the determined samples are labelled, and the operations further include obtaining the labelled samples, and training a machine learning model with the labelled samples.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 7A illustrates exemplary categories based on similar characteristics of training data in accordance with some embodiments;

FIG. 7B illustrates exemplary reward and sampling rate identifiers for explore and exploit groups for each of the categories of FIG. 6A in accordance with some embodiments;

DETAILED DESCRIPTION

Figure 1:
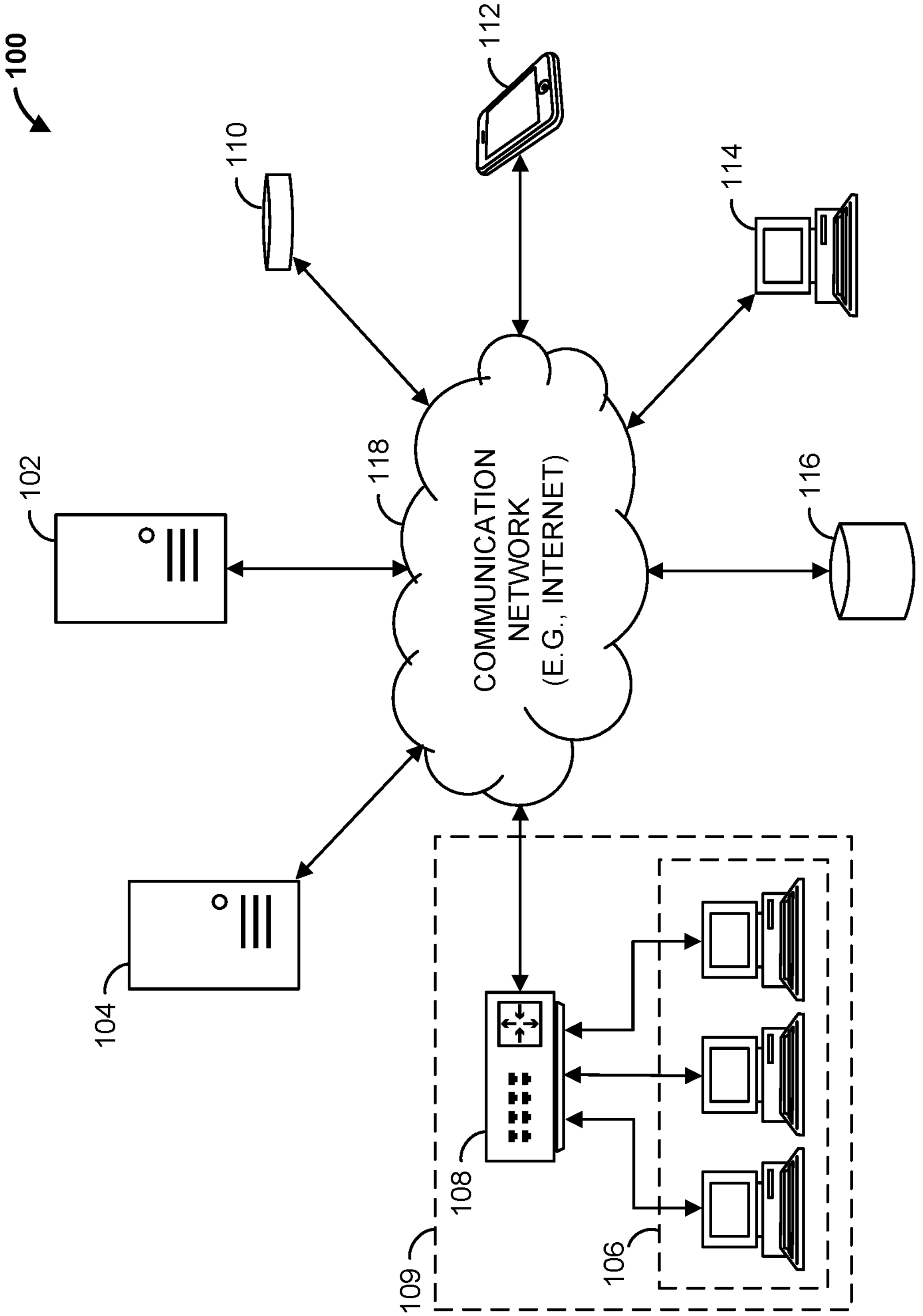
FIG. 1 is a block diagram of a machine learning training system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Merely as an example, the embodiments described herein may aggregate positively labelled training data, negatively labelled training data, and unlabeled training data. Positively labelled training data may include, for example, training data with known preferences, while negatively labelled training data may include training data with known non-preferences and unlabeled training data may include training data with unknown preferences. The positively labelled training data, along with the negatively labelled training data and the unlabeled training data are then clustered into similar segments. For example, a k-Means clustering algorithm may be applied to the positively labelled training data, negatively labelled training data, and the unlabeled training data to generate the segments. In some examples, application of the k-Means clustering algorithm includes applying a neural network to the positively labelled training data, negatively labelled training data, and the unlabeled training data to determine a subset of features (e.g., key features). The features are then clustered into the segments (e.g., cluster groups of a particular cluster size) based on determining, for example, a pairwise Euclidean distance between the features. Application of the Euclidean distance may identify unlabeled training data that is similar to, for example, positively labelled training data.

For each segment, the training data is associated with one of a plurality of categories (e.g., buckets) based on corresponding characteristics. As an example, the plurality of categories may include, for fraudulent activity applications, a "goods not returned and damaged returns risk" bucket, a "refund value, volume, and recency risk" bucket, a "cancellation risk" bucket, and a "collusion with drivers risk" bucket. The training data may be associated with these plurality of categories based on corresponding characteristics, such as a high refund amount, a high risk of collusion with a store associate, a high refund from overseas countries, or any other suitable characteristics.

Next, and for each category, the training data is separated into either an exploit group or an explore group based on determining a distance metric, such as a pairwise Euclidean distance, between positively labelled training data and all other training data (e.g., negatively labelled training data and unlabeled training data). For example, training data within a threshold distance of the positively labelled training data is associated with the exploit group, and training data not within the threshold distance is associated with the explore group. As a result, data items closer to known positively labelled data items are placed into an exploit sub-group and while the remaining data items are sub-grouped into an explore sub-group.

Once the explore and exploit groups are established for each category, a reward value and a sampling rate is determined and assigned to each group within each category. The reward value may be a metric that defines how "useful" a group is for providing recommendations, while the sampling rate may be a metric that defines proportions of items in each group to be recommended. Thus, by having a relatively high sampling rate for groups with high reward values, higher recommendation performance and reduced false positive rates may be achieved, albeit at the cost of exploring training data from other groups, which may have higher rewards should they be recommended.

Initially, the sampling rate for each group may be the same (e.g., assuming a total of 8 categories, then the sampling rate may be 12.5%). The initial reward value may be based the number of known positively labelled data compared to the remaining training data (e.g., negatively labelled training data and unlabeled training data) in each group. For example, the initial reward value may be the proportion of the number of known positively labelled data to the remaining training data in the group. Based on the initial reward value for a group and a total number of samples (e.g., data points) to be generated, a number of samples to be taken from each group is determined. For example, the number of samples from each group may be based on a proportion of a group's reward value to the total of the reward values for all groups. As described herein, the training data within the groups are then randomly sampled at each group's corresponding sampling rate to select samples for each group, up to the number of samples to be taken from the group. In some examples, only non-labelled training data is sampled.

The selected samples are then labelled. For example, the selected samples may be positively labelled, or negatively labelled. In some examples, operators (e.g., human annotators) determine how the selected samples are labelled. In some examples, one or more models, such as one or more rule-based models or machine learning based models, are applied to the selected samples for labelling. Once labelled, machine learning models may be trained not only with the originally positively and negatively labelled data, but with the newly labelled training data as well.

Moreover, and based on the labelled samples, the sampling rate and reward value for each group of each category may be updated for a next iteration of processing. For example, for each group, a proportion of the group's samples that were positively labelled is determined. For instance, if 100 samples from the group were selected for labelling, and 85 were positively labelled, a labelling value of 85% may be determined for the group. Moreover, the sampling rate for the group may be determined based on the labeling value. For example, the sampling rate may be adjusted based on a Beta distribution that operates on the labelling value, as described herein. Further, the reward value for the group (e.g., the number of samples to be selected from the group) may be adjusted based on the determined sampling rate for the group. For example, an algorithm that operates on the sampling rate may be executed to determine the adjusted reward value for the group. Additional training data may then be sampled as described above and herein using the updated sampling rates and reward values for the groups.

Turning to the drawings, FIG. 1 illustrates a block diagram of a machine learning training system 100 that includes a machine learning (ML) training computing device 102 (e.g., a server, such as an application server), a web server 104, workstation(s) 106, database 116, and multiple customer computing devices 110, 112, 114 operatively coupled over network 118. ML training computing device 102, workstation(s) 106, web server 104, and multiple customer computing devices 110, 112, 114 can each be any suitable computing device that includes any hardware or hardware and software combination for processing data. In addition, each can transmit data to, and receive data from, communication network 118.

For example, ML training computing device 102 can be a computer, a workstation, a laptop, a server such as a cloud-based server, or any other suitable device. Each of multiple customer computing devices 110, 112, 114 can be a mobile device such as a cellular phone, a laptop, a computer, a table, a personal assistant device, a voice assistant device, a digital assistant, or any other suitable device.

Additionally, each of ML training computing device 102, web server 104, workstations 106, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, machine learning training system 100 can include any number of customer computing devices 110, 112, 114. Similarly, machine learning training system 100 can include any number of workstation(s) 106, ML training computing devices 102, web servers 104, and databases 116.

Workstation(s) 106 are operably coupled to communication network 118 via router (or switch) 108. Workstation(s) 106 and/or router 108 may be located at a store 109, for example. Store 109 may be, for example, a retail location where customers may purchase goods or services. In some examples, customers may attempt to return purchased items (e.g., goods) to store 109. Workstation(s) 106 can communicate with ML training computing device 102 over communication network 118. The workstation(s) 106 may send data to, and receive data from, ML training computing device 102. For example, the workstation(s) 106 may transmit data related to a transaction, such as a purchase transaction, to ML training computing device 102. In response, ML training computing device 102 may transmit an indication of whether the transaction is to be allowed. Workstation(s) 106 may also communicate with web server 104. For example, web server 104 may host one or more web pages, such as a retailer's website. Workstation(s) 106 may be operable to access and program (e.g., configure) the webpages hosted by web server 104.

ML training computing device 102 is operable to communicate with database 116 over communication network 118. For example, ML training computing device 102 can store data to, and read data from, database 116. Database 116 can be a remote storage device, such as a cloud-based server, a memory device on another application server, a networked computer, or any other suitable remote storage. Although shown remote to ML training computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, an operator of one of multiple computing devices 110, 112, 114 may access the web page hosted by web server 104, add one or more items to an online shopping cart of the web page, and perform an online checkout of the shopping cart to purchase the items. In some examples, web server 104 may transmit data that identifies the attempted purchase transaction to ML training computing device 102. In response, ML training computing device 102 may transmit an indication of whether the transaction is to be allowed.

Figure 5A:
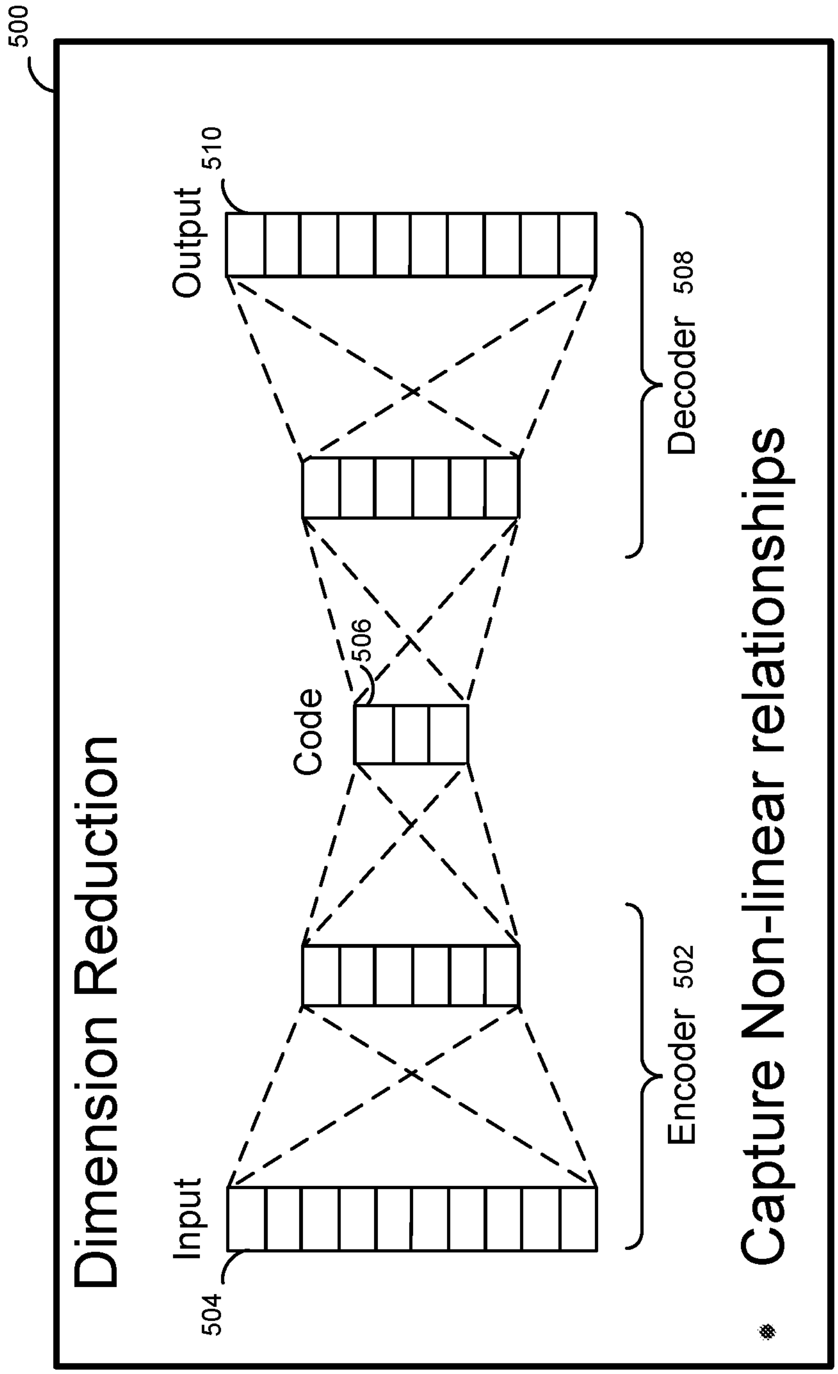
FIG. 5A illustrates a neural network for dimension reduction in accordance with some embodiments.

In some examples, ML training computing device 102 may aggregate data including labelled and unlabeled data with database 104. ML training computing device 102 may also generate features based on the aggregated data, and apply one or more auto-encoders, such as a neural network, to select a portion of the generated features (e.g., reduce the feature space to select "key" features). FIG. 5A illustrates an example auto-encoder 500 that includes an encoder 502 that operates on input features 504, identifies a reduced set of the input features at the "code" stage 506, and a decoder 508 that generates output features 510.

Figure 5B:
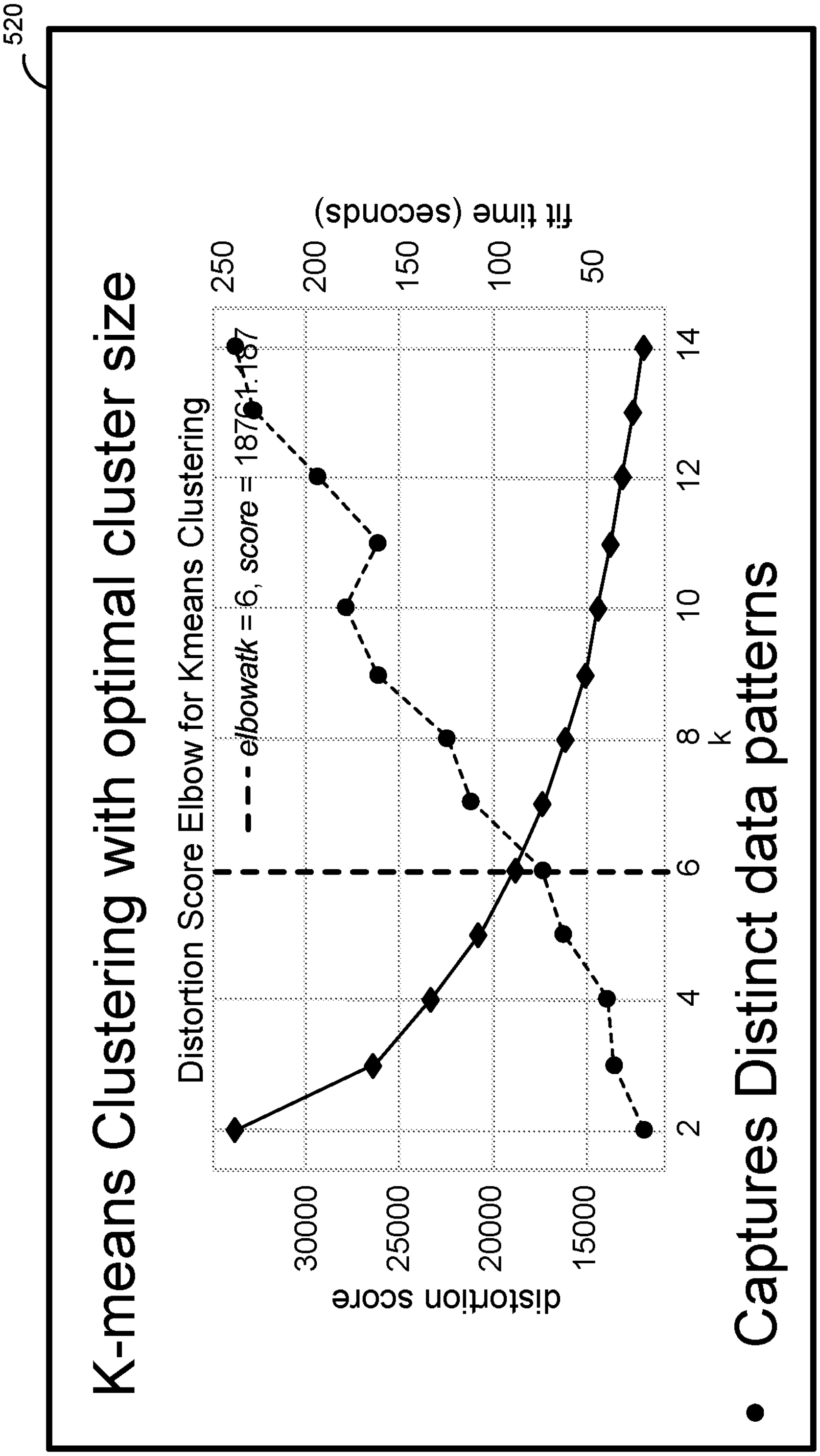
FIG. 5B illustrates results of exemplary K-means clustering in accordance with some embodiments.

ML training computing device 102 may then cluster the aggregated data, such as by applying a K-means clustering algorithm to the aggregated data. As an example, FIG. 5B illustrates a graph 520 indicating distortion scores and fit times for a K-means clustering algorithm, and further indicating an optimal cluster size at 6.

In some examples, and for each cluster, ML training computing device 102 may generate buckets based on defined characteristics associated with the application. For instance, to detect fraudulent returns, each cluster may be separated into a "goods not returned and damaged returns risk" bucket, a "refund value, volume and recency risk" bucket, a "cancellation risk" bucket, and a "collusion with drivers risk" bucket. FIG. 7A illustrates a chart 700 that includes categories 702 and corresponding descriptions 704, as an example.

Further, ML training computing device 102 may select one or more positively labelled samples from each cluster (or bucket) of the aggregated data, and determine whether other samples in each cluster (or bucket) are within a distance metric of the selected positively labelled samples based on the selected portion of the generated features (e.g., the "key" features). For example, ML training computing device 102 may determine a pairwise Euclidean distance between each selected positively labelled sample and every other sample in a cluster (or bucket). In some instances, the one or more positively labelled samples are randomly selected, and only those selected are used to determine distance metrics.

Figure 5C:
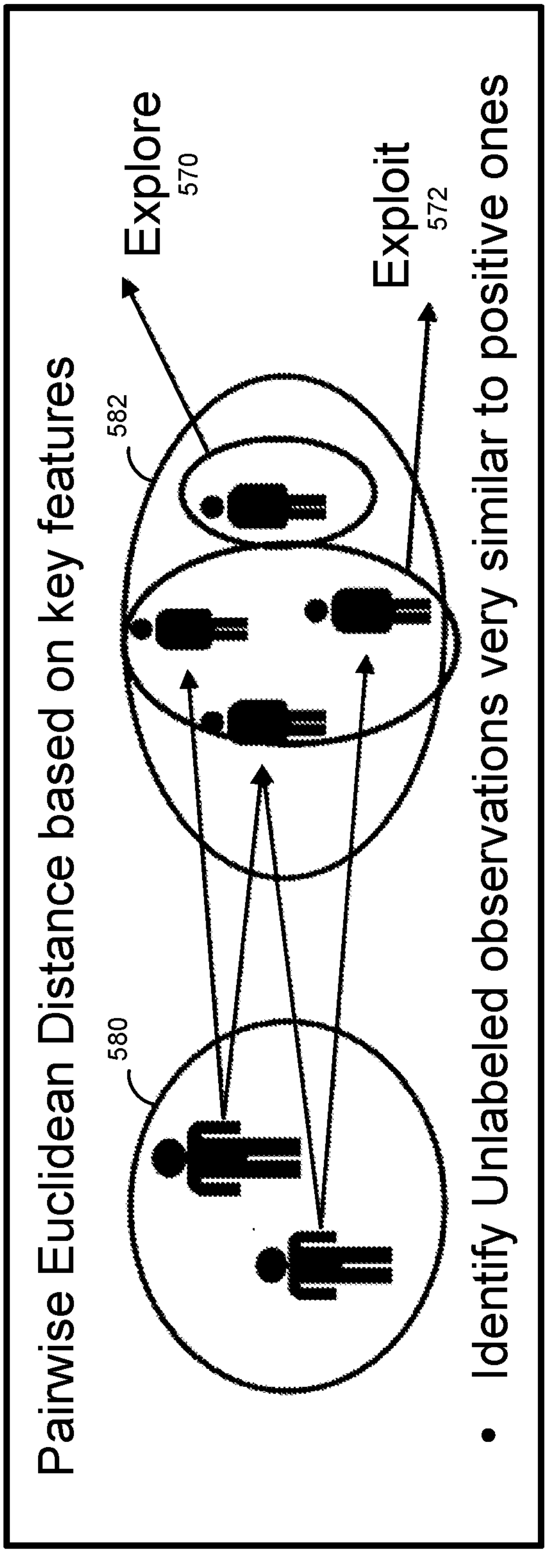
FIG. 5C illustrates distance metrics between two clusters in accordance with some embodiments.

ML training computing device 102 may further determine whether the Euclidean distance is at or within, or beyond, a threshold distance. Samples with a distance metric beyond the threshold distance may be aggregated into a cluster's "explore" sub-cluster, and samples with a distance at or within the threshold distance may be aggregated into a cluster's "exploit" sub-cluster. For example, FIG. 5C illustrates the determination of an explore group 570 and an exploit group 572 group based on pairwise Euclidean distances between positively labelled data 580 and unlabeled data 582. In some examples, a sample at or within the threshold distance to any positively labelled sample is placed in an "exploit" sub-cluster, while a sample with no determined distance to a positively labelled sample at or within the threshold distance is placed in an "explore" sub-cluster.

Figure 6:
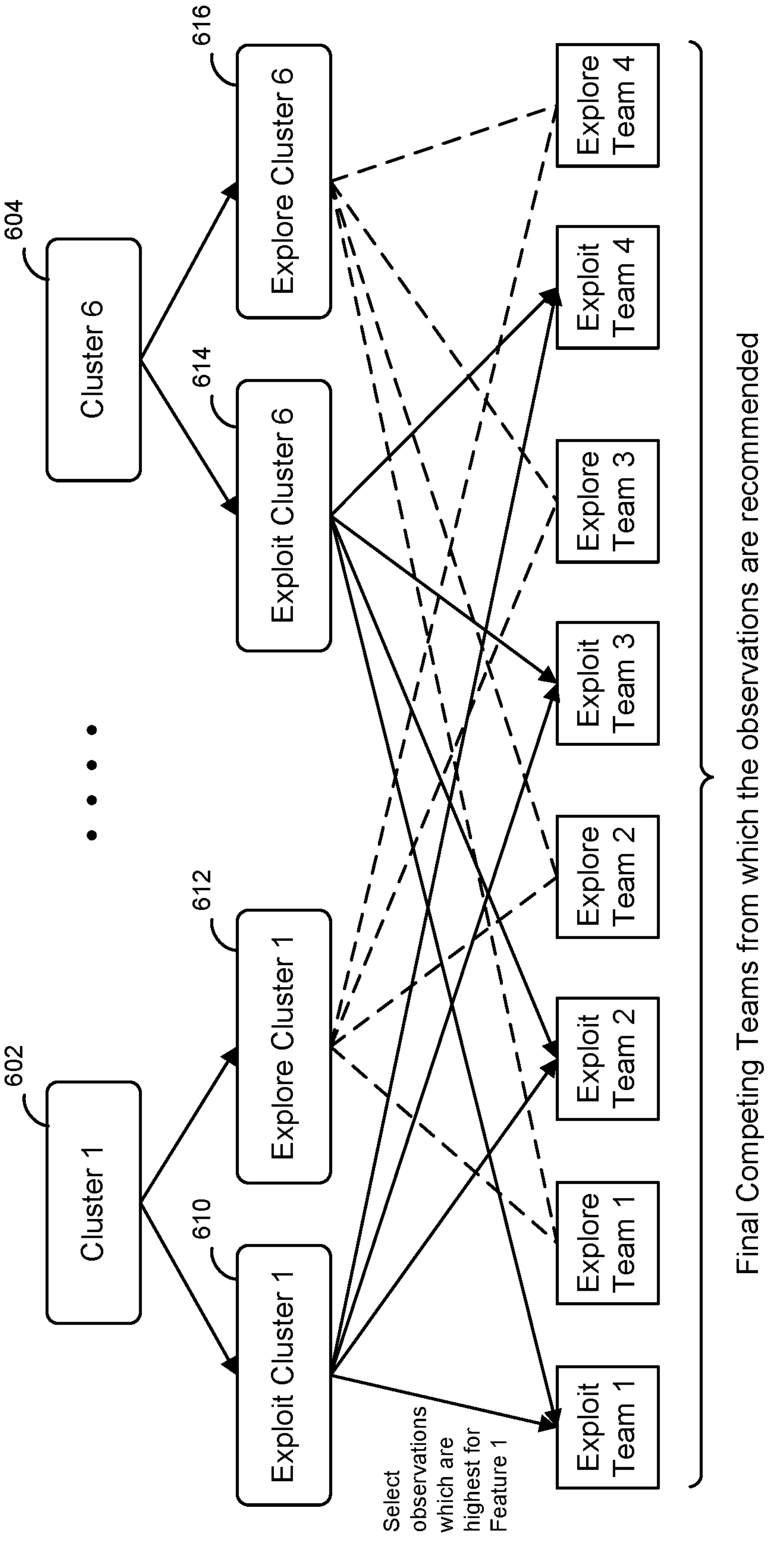
FIG. 6 illustrates data groupings in accordance with some embodiments.

ML training computing device 102 may further categorize the "explore" and "exploit" sub-clusters from all of the clusters into categories based on similar features. For example, in a fraudulent return example, the features may include a "high refund amount," a "high risk of collusion with store associate," and a "high refund from overseas countries." As an example, FIG. 6 illustrates a first cluster 602 and a sixth cluster 604, each of the first cluster 602 and sixth cluster 604 comprising an "exploit" sub-cluster 610, 614 and an "explore" sub-cluster 612, 616. Further the sub-clusters 610, 612, 614, 616 are assigned to a category, illustrated as a "team." Each "team" may be based on one or more similar features, such as a same one or more of the determined "key" features. For example, each data sample within "Exploit Team 1" may include a same feature (e.g., a high price, such as a price over a particular amount), while each data sample within "Exploit Team 2" may include another same feature (e.g., a same brand).

Further, a number of samples is randomly chosen from each category (up to a maximum amount, in some examples) for observation. For example, and based on the application, the chosen samples may be provided for expert review and labeling (e.g., identifying whether a return is fraudulent, whether an item advertisement is appropriate, etc.). The labelled data may then be stored in a data repository, and may be used to train one or more machine learning models. The machine learning models may include, for example, one or more decision trees, supervised machine learning algorithms such as Logic Regression, Support Vector Machines, Random Forest, Gradient Boosting Machines (e.g., XGBoost), or any other suitable machine learning models.

The number of samples selected from each category may be determined based on a corresponding reward rate and sampling rate. The reward rate is a metric that is indicative of how relevant a category is for providing accurate recommendations in a particular application. The sampling rate is a metric that is indicative of what fraction of the items in each category should be recommended. In addition, in at least some examples, a total capacity value indicates a total number of recommendations that are to be provided. The total capacity value may be based on, for example, the amount of processing resources available for generating labelled data, or based on an amount of time available to allow human annotator's to determine the labelling.

For example, FIG. 7B illustrates an explore chart 750 and an exploit chart 760. The explore chart 750 identifies, for each of the categories 702, an explore reward variable 752 and an explore sampling ratio variable 754. The explore reward variable 752 may store a reward rate for a corresponding "explore" sub-cluster associated with the corresponding category. Similarly, the sampling ratio variable 754 may store a sampling rate for the corresponding "explore" sub-cluster associated with the corresponding category. Exploit chart 760 identifies, for each of the categories 702, an exploit reward variable 762 and an exploit sampling ratio variable 764. The exploit reward variable 762 may store a reward rate for a corresponding "exploit" sub-cluster associated with the corresponding category. Similarly, the exploit sampling ratio variable 764 may store a sampling rate for the corresponding "exploit" sub-cluster associated with the corresponding category.

ML training computing device 102 may store the explore reward variables 752, explore sampling ratio variables 754, exploit reward variables 762, and exploit sampling ratio variables 764 in database 116, for example. Further, ML training computing device 102 may adjust any of the explore reward variables 752, explore sampling ratio variables 754, exploit reward variables 756, and exploit sampling ratio variables 758 as described herein.

For a given category (e.g., for each "team" in FIG. 6), ML training computing device 102 may, in some examples, initialize a sampling rate and reward rate for each category. For example, ML training computing device 102 may initialize sampling rates to be the same. For instance, assuming there are n categories, ML training computing device 102 may initialize the sampling rates (SRs) for the explore and exploit groups of the categories according to:

$$SR = \frac{1}{2n} \quad \text{(eq. 1)}$$

Moreover, ML training computing device 102 may initialize the rewards rates based on the number of positively labelled samples in the category and the total number of samples in each of the explore and exploit groups of each category (e.g., a proportion of the number of positively labelled samples to the total number of samples in the group). For example, ML training computing device 102 may initialize the rewards rates (RRs) according to:

$$RR=S/R \quad \text{(eq. 2)}$$

where:

S is the number of positively labelled samples in a category; and

R is the total number of samples in the category.

In a first iteration, ML training computing device 102 may select samples from each category (e.g., "team") at the same rate (e.g., in accordance with eq. 1). ML training computing device 102 may select samples from the categories up to the total capacity value. The selected samples may then be stored, and provided as recommendations for labeling. For example, the selected samples may be analyzed by human annotators who may determine, for example, if they are associated with a particular characteristic (e.g., a fraudulent return). Based on the analysis, a selected sample may be positively labelled (e.g., fraudulent label), negatively labelled (e.g., not fraudulent), or unlabeled. In some examples, the selected samples are "tested" in an active system. For example, in the case of providing item advertisements, the selected samples may characterize items to advertise. Item advertisements for the selected samples may be provided to a customer browsing a website (e.g., hosted by web server 104), and based on whether the customer engages with the item advertisement, the selected sample may be positively or negatively labelled. For example, if the customer clicks on the item advertisement, purchases the advertised item, or adds the item to an online shopping cart, the selected sample may be positively labelled. The labelled samples may then be aggregated in database 116 as additional labelled data that can be used to train the corresponding machine learning models (e.g., machine learning models that detect fraud, or that provide item advertisements).

Figure 11:
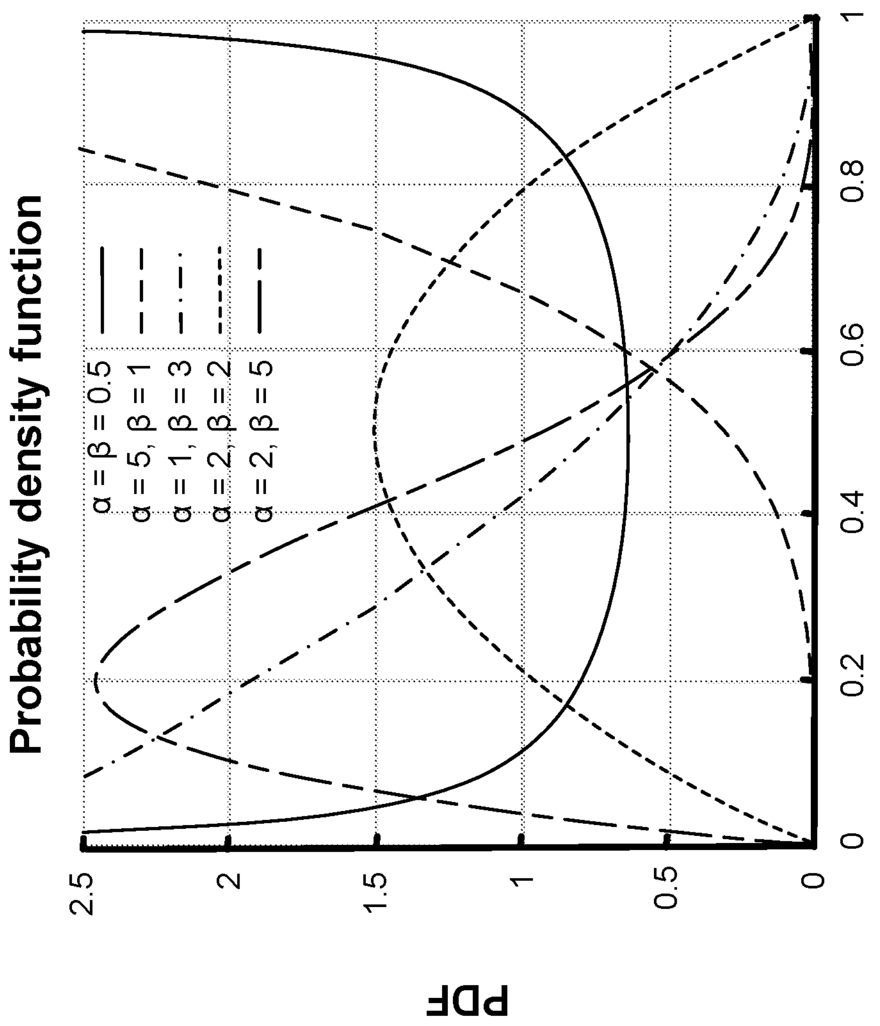
FIG. 11 illustrates a Beta distribution chart with Beta distribution curves for a probability density function in accordance with some embodiments.

ML training computing device 102 may adjust the sampling rates based on a Beta Distribution of sampling rates. FIG. 11 illustrates a Beta distribution chart 1100 with Beta distribution curves for a probability density function, which illustrate the probabilities of selecting sampling rates in a range from 0 to 1 based on two parameters, α and β. Parameter α may represent the reward rate, such as the proportion (e.g., percentage) of positively labelled data samples from all data samples in a category that were provided for labelling (e.g., in a previous iteration). For example, parameter α may be determined according to:

$$\alpha = \text{positively labelled samples/total samples} \quad \text{(eq. 3)}$$

Parameter β may be determined according to:

$$\beta = 1 - \alpha \quad \text{(eq. 4)}$$

When, for example parameters, α and β=5, then there is equal chance of choosing a lower and higher sampling rate (e.g., in the range 0 to 1). This may beneficial for categories whose rewards (e.g., reward rates) are neither lower nor higher in the recent past. When β is much greater than α, there is higher chance of choosing a lower sampling rate. This may be beneficial for categories having lower average rewards in the recent past. Finally, when α is much greater than β, there is higher chance of choosing a lower sampling rate. This may be beneficial for categories having higher average rewards in the recent past.

In some examples, α and β are determined according to:

$$\hat{\alpha}=1+(\text{mean reward rate for last } k \text{ interactions}*10) \quad \text{(eq. 5)}$$

$$\hat{\beta}=1+(1-\text{mean reward rate for last } k \text{ interactions}*10) \quad \text{(eq. 6)}$$

where k is a predefined number of iterations (e.g., 10, 100, 1000, etc.).

In some examples, α and are determined according to:

$$\hat{\alpha}=1+(\text{\% of observations labelled Positive in last } k \text{ learning interactions})\times 10 \quad \text{(eq. 7)}$$

$$1+(1-\text{\% of observations labelled Positive in last } k \text{ learning interactions})\times 10 \quad \text{(eq. 8)}$$

As an example, ML training computing device 102 may adjust the sampling rate for a category i according to:

$$SR_i=\text{random sample from Beta}(\alpha,\beta) \quad \text{(eq. 9)}$$

Further, ML training computing device may determine a number of samples to be recommended from each category according to the random sample value generated from applying the Beta Distribution. For example, ML training computing device 102 may determine the number of samples to be recommended from each category according to:

$$\eta_i=N*SR_i/\Sigma_i SR_i \quad \text{(eq. 10)}$$

where N is the total capacity value.

Thus, for example, assume there are six categories, the six categories have a current sampling rate (e.g., $SR_i$) of 0.6, 0.2, 0.7, 0.9, 0.4, and 0.3. Also assume a total capacity value of 15. The number of samples to be selected from the category associated with the sampling rate of 0.6 would be 3 (15*(0.6/(0.6+0.2+0.7+0.9+0.4+0.3))=2.9 then rounded to 3). Thus, 3 samples would be selected from the category associated with the 0.6 sampling rate.

As described herein, the selected samples may be "tested" either by, for example, providing the selected samples to a human annotator for labelling, or by acting upon the selected samples to determine if they produce an expected our wanted outcome (e.g., click on item advertisement), and. Once labelled, the selected samples may be used to train a machine learning model, thereby providing additionally labelled data for the training.

As such, the embodiments may identify explore and exploit buckets (e.g., sub-clusters) dynamically using feature space reduction and segmentation. Additionally, the embodiments may employ a beta distribution for every explore and exploit bucket based on past rewards, and further dynamically assigns the explore and exploit sampling rate (recommended data points) for a next iteration from each bucket based on concurrent arm beta sampling. Moreover, the embodiments may dynamically provide more weight to rewards from recent iterations compared to older ones (e.g., based on parameter k). Further, the randomness introduced by, for example, the Beta Distribution to determine sampling rates offers exploitation to increase the model learning rate.

Among other advantages, the embodiments herein may improve machine learning models, as they are trained with additional labelled training data that otherwise may not be available. In addition, the embodiments may increase machine learning model performance and hit rates by improving quality of recommendations in rare event scenarios. Persons of ordinary skill in the art having the benefit of these disclosures would appreciate additional benefits as well.

Figure 2:
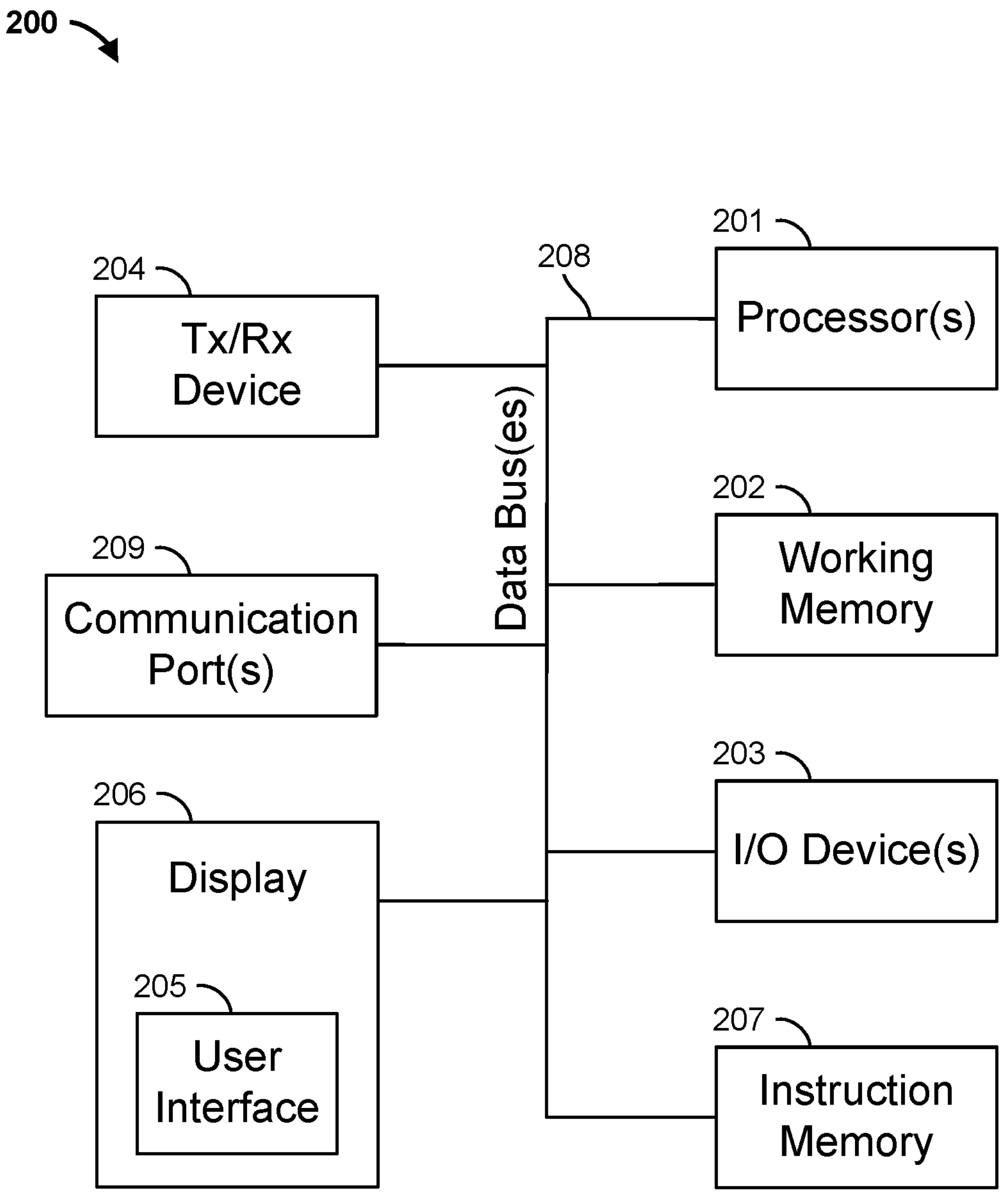
FIG. 2 is a block diagram of the machine learning (ML) training computing device of the machine learning training system of FIG. 1 in accordance with some embodiments.

FIG. 2 illustrates the ML training computing device 102 of FIG. 1. ML training computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of ML training computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as configuration data (e.g., to establish parameter values, such as number of categories, number of iterations, total capacity values, etc.).

Display 206 can display user interface 205. User interfaces 205 can enable user interaction with ML training computing device 102. For example, user interface 205 can be a user interface for an application of a retailer that allows a customer to purchase one or more items from the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 ML training computing device 102 will be operating in. Processor(s) 201 is operable to receive data from, or send data to, a network, such as communication network 118 of FIG. 1, via transceiver 204.

Figure 3:
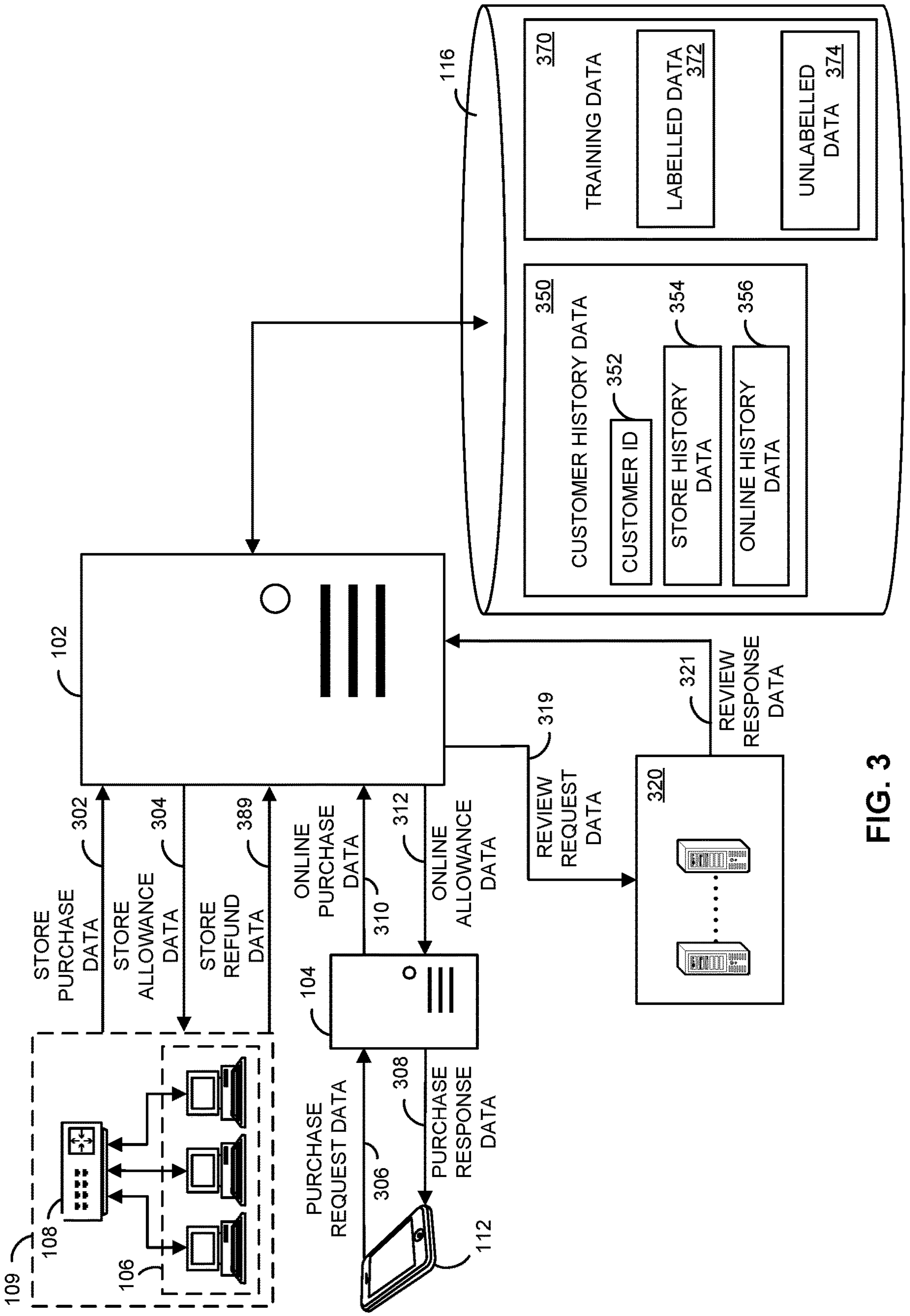
FIG. 3 is a block diagram illustrating examples of various portions of the machine learning training system of FIG. 1 in accordance with some embodiments.

FIG. 3 is a block diagram illustrating examples of various portions of the machine learning training system of FIG. 1. In some examples, ML training computing device 102 may apply one or more trained machine learning models to detect fraudulent activity, such as a fraudulent return. The trained machine learning models may be trained with training data 370, which may include labelled data 372 and, in some examples, unlabeled data 374. To train the machine learning models, ML training computing device 102 may apply the processes described herein to increase the amount of labelled data 372.

For example, ML training computing device 102 may determine, from an initial set of training data 370, positively labelled training data (e.g., from labelled data 372), negatively labelled training data (e.g., from labelled data 372), and unlabeled training data (e.g., from unlabeled data 374). ML training computing device 102 may apply a k-Means clustering algorithm to the positively labelled training data, the negatively labelled training data, and the unlabeled training data to generate clusters. In some examples, application of the k-Means clustering algorithm includes applying a neural network to the positively labelled training data, negatively labelled training data, and the unlabeled training data to determine a subset of features (e.g., key features). ML training computing device 102 the clusters the features (e.g., cluster groups of a particular cluster size) based on determining, for example, a pairwise Euclidean distance between the features. Application of the Euclidean distance may identify unlabeled training data that is similar to, for example, positively labelled training data.

For each cluster, ML training computing device 102 associates the training data with one of a plurality of categories based on corresponding characteristics. As an example, the plurality of categories may include, for fraudulent activity applications, a "goods not returned and damaged returns risk" bucket, a "refund value, volume, and recency risk" bucket, a "cancellation risk" bucket, and a "collusion with drivers risk" bucket. The training data may be associated with these plurality of categories based on corresponding characteristics, such as a high refund amount, a high risk of collusion with a store associate, a high refund from overseas countries, or any other suitable characteristics.

Next, and for each category, ML training computing device 102 separates the training data into either an exploit group or an explore group based on determining a distance metric, such as a pairwise Euclidean distance, between positively labelled training data and all other training data (e.g., negatively labelled training data and unlabeled training data). For example, training data within a threshold distance of the positively labelled training data is associated with the exploit group, and training data not within the threshold distance is associated with the explore group.

Once the explore and exploit groups are established for each category, ML training computing device 102 samples the explore and exploit groups based on corresponding reward values and sampling rates. The explore and exploit groups may be sampled, for example, based on a sampling rate determined from a Beta Distribution of sampling rates, such as described herein with respect to equation 9.

As described herein, ML training computing device 102 samples the training data within the groups based on each group's corresponding sampling rate to select samples for each group, up to the number of samples to be taken from the group.

The selected samples may then be transmitted for labelling. For example, ML training computing device 102 may generate review request data 319 characterizing the selected samples, and may transmit review request data 319 to labeling servers 320. Labelling servers 320 may, for example, allow operators to inspect the selected samples, and apply a label to the selected samples based on their analysis. For example, in a fraud detection example, the operators may, via the labelling servers 320, label a selected sample as "fraudulent" or "not fraudulent." The labelling servers 320 may then generate review response data 321 characterizing the labelled samples, and may transmit review response data 321 to ML training computing device 102. ML training computing device 102 may then store the labelled samples as labelled data 372, thus augmenting and increasing the original set of labelled data 372. Further, ML training computing device 102 may train the one or more machine learning models based on the updated labelled data 372.

As an example, ML training computing device 102 may receive store purchase data 302 for a customer making a purchase at store 109. ML training computing device 102 may apply a trained machine learning model to the store purchase data 302 and/or customer history data 350 for the customer (e.g., based on a corresponding customer ID 352) to determine whether the purchase is fraudulent. Based on the output of the trained machine learning model, ML training computing device 102 may generate store allowance data 304 characterizing whether the purchase is fraudulent or not, and may transmit store allowance data 304 to store 109. Store 109 may allow, or disallow, the purchase based on store allowance data 304.

As another example, ML training computing device 102 may receive store refund data 389 for a customer returning items at store 109. ML training computing device 102 may apply a trained machine learning model to the store refund data 389 and/or customer history data 350 for the customer (e.g., based on a corresponding customer ID 352) to determine whether the purchase is fraudulent. Based on the output of the trained machine learning model, ML training computing device 102 may generate store allowance data 304 characterizing whether the return is fraudulent or not, and may transmit store allowance data 304 to store 109. Store 109 may allow, or disallow, the return based on store allowance data 304.

Similarly, ML training computing device 102 may receive online purchase data 310 for a customer making a purchase at a website hosted by web server 104. ML training computing device 102 may apply a trained machine learning model to the online purchase data 310 and/or customer history data 350 for the customer (e.g., based on a corresponding customer ID 352) to determine whether the purchase is fraudulent. Based on the output of the trained machine learning model, ML training computing device 102 may generate online allowance data 312 characterizing whether the purchase is fraudulent or not, and may transmit online allowance data 312 to web server 104. The reception of online allowance data 312 may cause web server 104 to allow, or disallow, the purchase.

Figure 4:
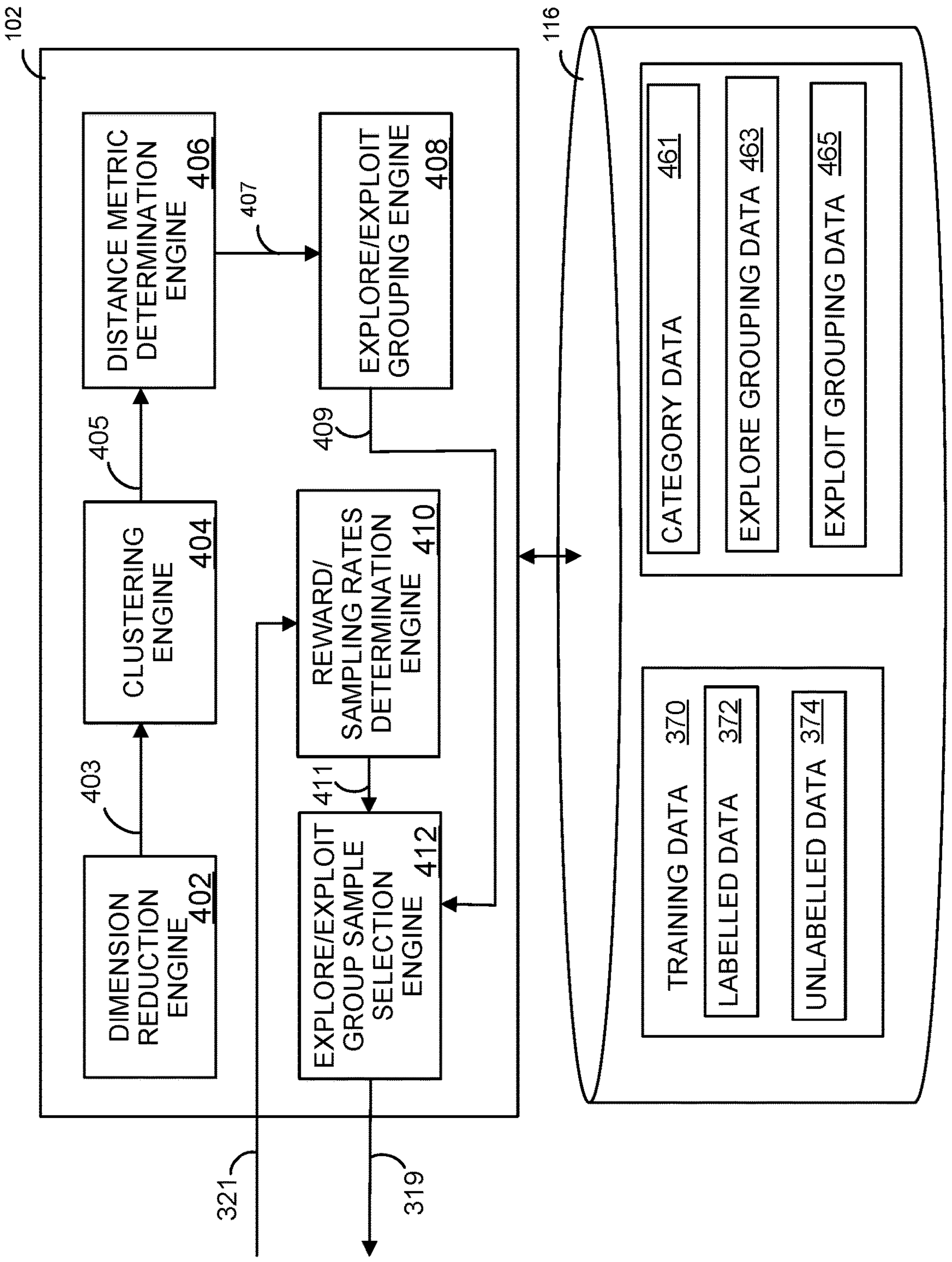
FIG. 4 is a block diagram illustrating examples of various portions of the machine learning training system of FIG. 1 in accordance with some embodiments.

FIG. 4 is a block diagram illustrating examples of various portions of the ML training computing device 102 of FIG. 1. As indicated in the figure, ML training computing device 102 includes dimension reduction engine 402, clustering engine 404, distance metric determination engine 406, explore/exploit grouping engine 408, reward/sampling rates determination engine 410, and explore/exploit group sample selection engine 412. In some examples, one or more of dimension reduction engine 402, clustering engine 404, distance metric determination engine 406, explore/exploit grouping engine 408, reward/sampling rates determination engine 410, and explore/exploit group sample selection engine 412 may be implemented in hardware. In some examples, one or more of dimension reduction engine 402, clustering engine 404, distance metric determination engine 406, explore/exploit grouping engine 408, reward/sampling rates determination engine 410, and explore/exploit group sample selection engine 412 may be implemented as an executable program maintained in a tangible, non-transitory memory, such as instruction memory 207 of FIG. 2, that may be executed by one or processors, such as processor 201 of FIG. 2.

Dimension reduction engine 402 may obtain training data 370, which may include labelled data 374 and unlabeled data 376, and generate features based on the training data 370. Further, dimension reduction engine 402 may apply one or more auto-encoders, such as a neural network, to select a portion of the generated features, and transmit the portion of features 403 to clustering engine 404.

Clustering engine 404 cluster the portion of features 403, such as by applying a K-means clustering algorithm to the portion of features 403. Further, and for each cluster, clustering engine 404 may generate buckets based on predefined characteristics (e.g., attributes, predefined rules). For instance, for detecting fraudulent returns, each cluster may be separated into a "goods not returned and damaged returns risk" bucket, a "refund value, volume and recency risk" bucket, a "cancellation risk" bucket," and a "collusion with drivers risk" bucket. Clustering engine 404 may generate clustering data 405 characterizing the generated buckets, and may transmit clustering data 405 to distance metric determination engine 406.

Distance metric determination engine 406 may, determine one or more positively labelled samples from each bucket, and may further determine a distance metric, such as a pairwise Euclidean distance, between each selected positively labelled sample and every other sample in each corresponding bucket. Distance metric determination engine 406 may generate distance metric data 407 characterizing the determined distances, and may transmit distance metric data 407 to explore/exploit grouping engine 408.

Explore/exploit grouping engine 408 may determine whether the received distances are at or within, or beyond, a threshold distance. The threshold distance may be a configured parameter, for example. Further, explore/exploit grouping engine 408 may aggregate samples with a distance metric beyond the threshold distance into an "explore" sub-cluster, and samples with a distance at or within the threshold distance may be aggregated into an "exploit" sub-cluster. In some examples, explore/exploit grouping engine 408 may further categorize the "explore" and "exploit" sub-clusters from all of the clusters into categories (e.g., "teams") based on similar features. The categories may be defined, for example, by category data 461 stored in database 116. For example, explore/exploit grouping engine 408 may obtain category data 461 from database 116, and determine the categories based on category data 461.

Explore/exploit grouping engine 408 may generate explore/exploit grouping data 409 characterizing the sub-clusters and/or sub-cluster categories, and may transmit explore/exploit grouping data 409 to explore/exploit group sample selection engine 412. Explore/exploit grouping engine 408 may also store explore/exploit grouping data 409 within database 116. For example, explore/exploit grouping engine 408 may store the explore sub-clusters as explore grouping data 463, and the exploit sub-clusters as exploit grouping data 465.

Explore/exploit group sample selection engine 412 may sample the sub-clusters and/or categories based on corresponding reward rates and sampling rates 411 received from reward/sampling rates determination engine 410. For example, reward/sampling rates determination engine 410 may determine an initial sample rate for each sub-cluster or category based on the number of sub-clusters or categories (e.g., based on equation 1), and may determine an initial reward rate for each sub-cluster or category based on the number of positively labelled samples and the total number of samples in the sub-cluster or category (e.g., based on equation 2), as described herein. Further, after each iteration (e.g., the processing of a threshold amount of training data 370), reward/sampling rates determination engine 410 may update the reward rates based on a proportion (e.g., percentage) of positively labelled data samples from all data samples in a sub-cluster or category that were provided for labelling (e.g., in a previous iteration). Reward/sampling rates determination engine 410 may then update the sampling rates based on a Beta Distribution of sampling rates, where each determined sampling rate is based on the current reward rate. For example, reward/sampling rates determination engine 410 may determine parameters $\alpha$ and $\beta$ (e.g., in accordance with one of equations 3 and 4, 5 and 6, or 7 and 8), and may further determine the sampling rates by applying a Beta Distribution algorithm to the determined parameters $\alpha$ and $\beta$ (e.g., in accordance with equation 9). Reward/sampling rates determination engine 410 may then transmit the reward rates and sampling rates 411 to explore/exploit group sample selection engine 412.

Explore/exploit group sample selection engine 412 may select one or more samples from the sub-clusters and/or categories based on sampling the sub-clusters and/or categories based on corresponding reward rates and sampling rates 411, and may generate review request data 319 characterizing the selected samples.

Figure 8:
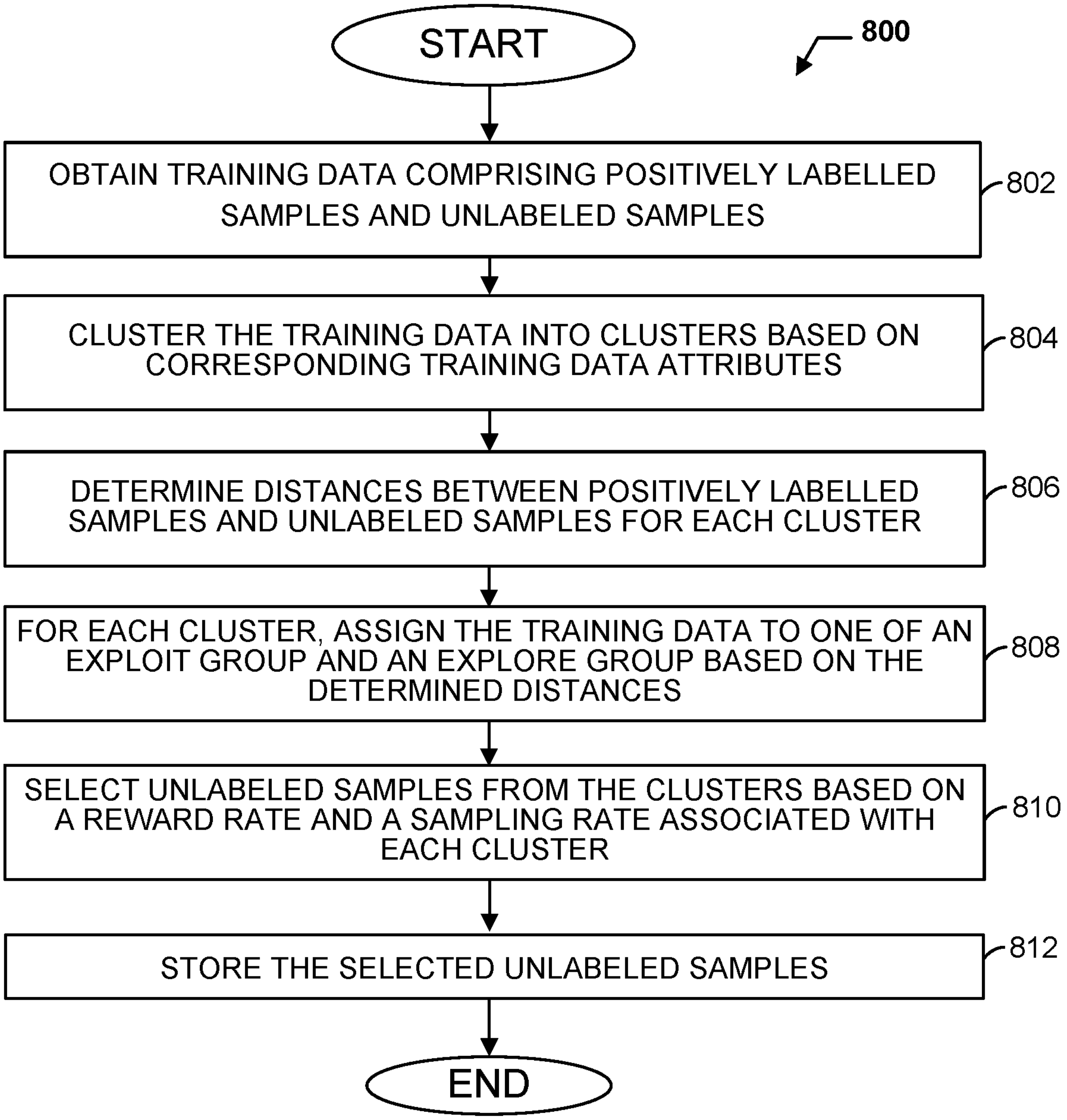
FIG. 8 is a flowchart of an example method that can be carried out by the training computing device of FIG. 1 in accordance with some embodiments.

FIG. 8 is a flowchart of an example method 800 that can be carried out by the ML training computing device 102 of the machine learning training system 100 of FIG. 1. Beginning at step 802, ML training computing device 102 obtains training data comprising positively labelled samples and unlabeled samples (e.g., from database 116). At step 804, ML training computing device 102 clusters the training data into clusters based on corresponding training data attributes. For example, ML training computing device 102 may apply a K-means algorithm to generate the clusters. Further, and at step 806, ML training computing device 102 may determine distances between positively labelled samples and unlabeled samples of each cluster. For example, ML training computing device 102 may apply a neural network to the training data (e.g., which may include positively labelled training data, negatively labelled training data, and unlabeled training data) to determine a subset of features, and may determine a pairwise Euclidean distance between the features of each cluster.

Continuing to step 808, ML training computing device 102 may, for each cluster, assign the training data to one of an exploit group and an explore group based on the determined distances. For example, ML training computing device 102 may assign training data within a threshold distance of the positively labelled training data to an exploit group, and training data not within the threshold distance to an explore group.

Figure 9:
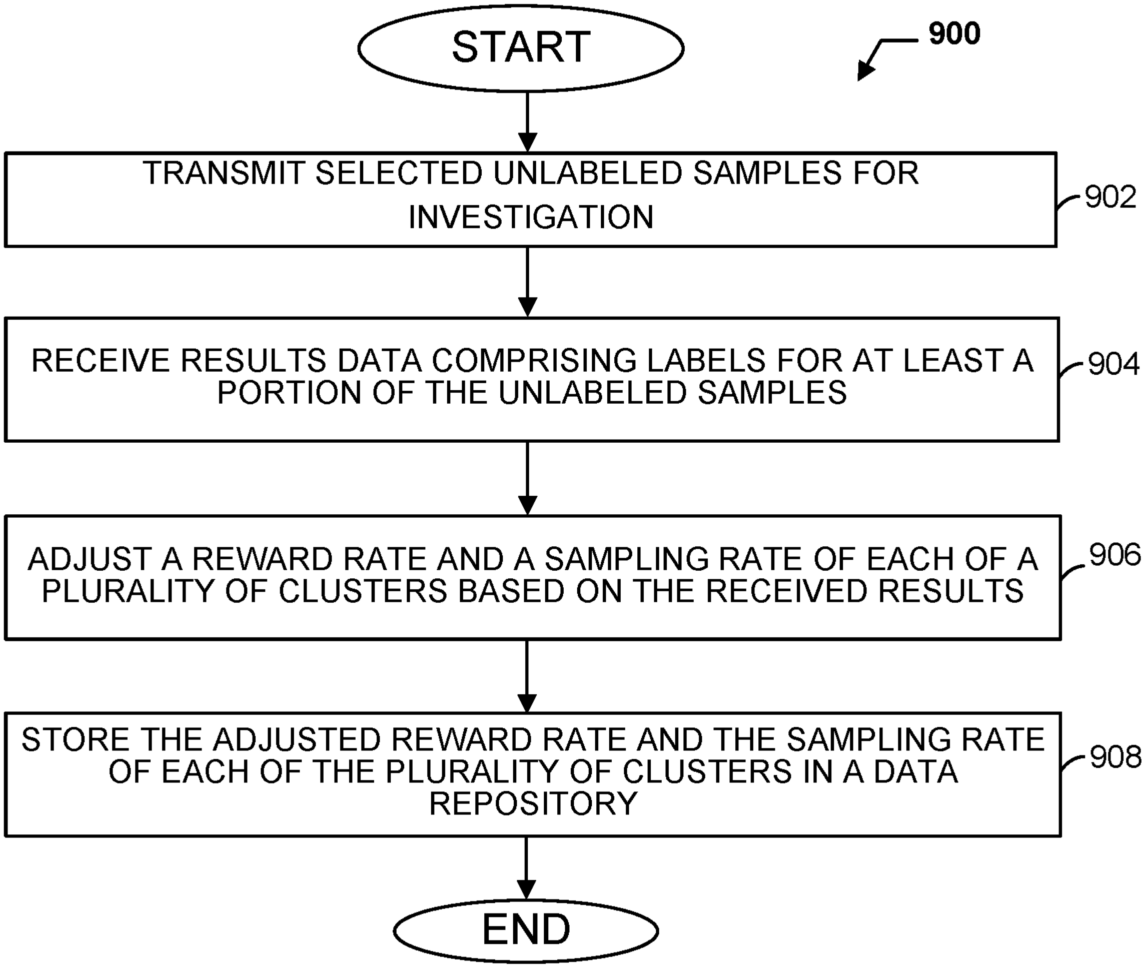
FIG. 9 is a flowchart of another example method that can be carried out by the training computing device of FIG. 1 in accordance with some embodiments.

At step 810, ML training computing device 102 selects unlabeled samples from the clusters based on a reward rate and a sampling rate associated with each cluster. For example, ML training computing device 102 may determine a reward rate and a sampling rate for each of the exploit and explore groups of each cluster, and may sample the explore and exploit groups based on the determined reward and sampling rates (e.g., based on a Beta distribution of sampling rates) to select the unlabeled samples. In some examples, a number of samples are selected from each explore and exploit group in accordance with equation 9 as described herein. Further, and at step 812, ML training computing device 102 may store the selected unlabeled samples, such as in database 116. The method then ends FIG. 9 is a flowchart of an example method 900 that can be carried out by the ML training computing device 102 of the machine learning training system 100 of FIG. 1. Beginning at step 902, ML training computing device 102 transmits unlabeled samples for investigation. For example, ML training computing device 102 may transmit review request data 319 to labelling servers 320, wherein the review request data 319 characterizes selected unlabeled samples. At step 904, results data is received. The results data comprises labels for at least a portion of the unlabeled samples. For example, ML training computing device 102 may receive, from labeling servers 320, review response data 321 characterizing labelled samples.

Proceeding to step 906, ML training computing device 102 may adjust a reward rate and a sampling rate of each of a plurality of clusters (e.g., explore and exploit clusters) based on the received results. For example, and as described herein, ML training computing device 102 may determine a proportion of the number of transmitted and selected unlabeled samples that, based on the received results, were positively labelled. Based on the determined proportion, ML training computing device 102 may adjust the sampling rate for each cluster (e.g., in accordance with equation 9). At step 908, ML training computing device 102 stores the adjusted reward rate and sampling rate of each of the plurality of clusters in a data repository, such as within database 116. The method then ends.

Figure 10:
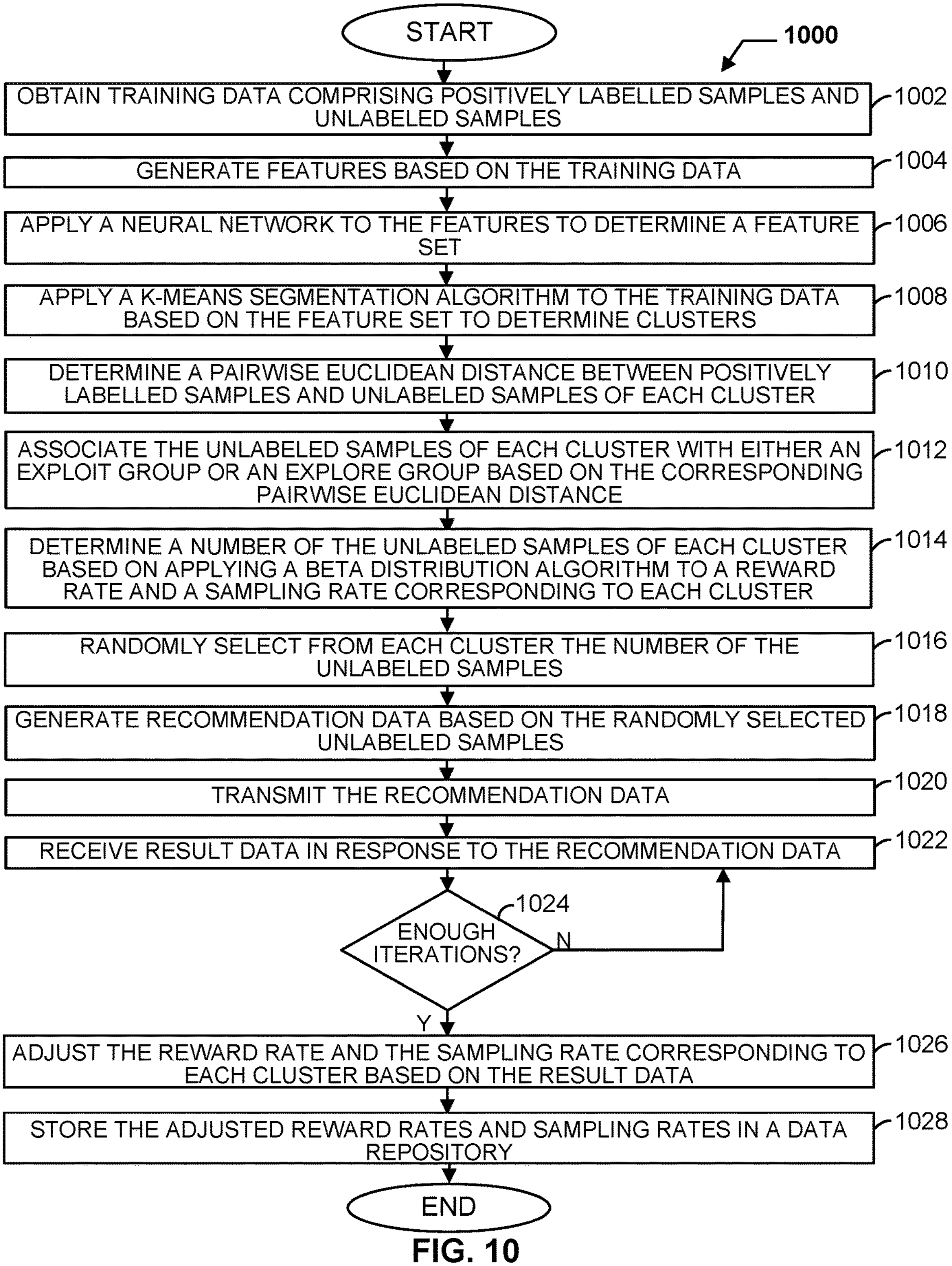
FIG. 10 is a flowchart of yet another example method that can be carried out by the training computing device of FIG. 1 in accordance with some embodiments.

FIG. 10 is a flowchart of an example method 1000 that can be carried out by the ML training computing device 102 of the machine learning training system 100 of FIG. 1. Beginning at step 1002, ML training computing device 102 obtains training data comprising positively labelled samples and unlabeled samples. At step 1004, ML training computing device 102 generates features based on the training data. Further, and at step 1006, ML training computing device 102 applies a neural network to the features to determine a feature set (e.g., key features).

Proceeding to step 1008, ML training computing device 102 applies a K-means segmentation algorithm to the training data based on the feature set to determine clusters. Further, and at step 1010, ML training computing device 102 determines a pairwise Euclidean distance between positively labelled samples and unlabeled samples of each cluster. Further, and at step 1012, ML training computing device 102 associates the unlabeled samples of each cluster with either an exploit group or an explore group based on the corresponding pairwise Euclidean distances.

At step 1014, ML training computing device 102 determines a number of the unlabeled samples of each cluster based on applying a Beta Distribution algorithm to a reward rate and a sampling rate corresponding to each cluster. Further, and at step 1016, ML training computing device 102 randomly selects from each cluster the number of unlabeled samples. At step 1018, ML training computing device 102 generates recommendation data (e.g., review request data 319) based on the randomly selected unlabeled samples. Further, and at step 1020, ML training computing device 102 transmits the recommendation data. For example, ML training computing device 102 may transmit the recommendation data to determine labels for the selected unlabeled samples (e.g., for labelling by human annotators or by "testing" the selected unlabeled samples in a corresponding application). The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:

a memory device comprising instructions; and one or more processors communicatively coupled to the memory device, wherein the instructions, when executed, cause the one or more processors to:

obtain, from a database, training data comprising a plurality of positively labeled samples and a plurality of unlabeled samples;

select, from the plurality of unlabeled samples for a respective model, one or more unsampled labels by performing a process comprising:

apply a clustering algorithm to the training data and, in response, generate as output from the clustering algorithm, a plurality of clusters of the training data based on one or more corresponding attributes of the training data, each respective cluster of the training data comprising a corresponding portion of the plurality of positively labeled samples and a corresponding portion of the plurality of unlabeled samples;

determine, for each respective cluster of the training data in the plurality of clusters of the training data, one or more corresponding distance metrics collectively defined between each sample of the corresponding portion of the plurality of positively labeled samples and each sample of the corresponding portion of the plurality of unlabeled samples;

generate, for each respective cluster of the training data, a corresponding plurality of sub-clusters based on the one or more corresponding distance metrics;

for each respective sub-cluster of the corresponding plurality of sub-clusters of each respective cluster of the training data:

generate a corresponding reward value based on a first subset of samples defined by the corresponding portion of the plurality of positively labeled samples for the respective sub-cluster and a second subset of samples defined by the corresponding portion of the plurality of unlabeled samples for the respective sub-cluster;

generate a corresponding sampling rate based on the reward value for the respective sub-cluster; and store the corresponding reward value and the corresponding sampling rate in the database;

sample respective sub-cluster of the corresponding plurality of sub-clusters based on the corresponding reward value and the corresponding sampling rate to select the one or more of the plurality of unlabeled samples;

store the one or more of the plurality of unlabeled samples from each of the plurality of sub-clusters in the database accessible to one or more models, each respective model in the one or more models comprising a corresponding plurality of parameters; and train a first model in the one or more models on a first task using the one or more of the plurality of unlabeled samples from each of the plurality of sub-clusters to determine first values of the corresponding plurality of parameters to optimize performance of the first task, thereby forming a plurality of trained parameters.

2. The system of claim 1, wherein generating, for each of the respective sub-cluster of the training data, the corresponding plurality of sub-clusters comprises determining whether each distance metric is within a threshold distance of the portion of the plurality of positively labelled samples.

3. The system of claim 2, wherein generating, for each of the clusters respective cluster of the training data, the corresponding plurality of sub-clusters further comprises:

associating each of the portion of the plurality of unlabeled samples within the threshold distance of the positively labelled samples with a first sub-cluster of the plurality of sub-clusters; and associating each of the portion of the plurality of unlabeled samples not within the threshold distance of the positively labelled samples with a second sub-cluster of the plurality of sub-clusters.

4. The system of claim 1, further comprising determining the corresponding reward value for each respective sub-cluster based on an amount of the portion of the plurality of positively labelled samples with respect to an amount of the training data.

5. The system of claim 1, wherein the instructions further cause the one or more processors to determine a label for the determined unlabeled samples from each of the plurality of sub-clusters.

6. The system of claim 5, wherein the instructions further cause the one or more processors to apply a model, in the one or more models, to the determined unlabeled samples to determine the label.

7. The system of claim 5, wherein the instructions further cause the one or more processors to train the first model, in the one or more models, based on the determined label and the corresponding unlabeled samples.

8. The system of claim 1, wherein the instructions further cause the one or more processors to adjust the corresponding sampling rate corresponding to each sub-group based on a proportion of the sub-cluster's unlabeled samples that were positively labelled.

9. The system of claim 1, wherein the instructions further cause the one or more processors to determine the distance metrics based on determining a Euclidean distance between the portion of the plurality of positively labelled samples and the portion of the plurality of unlabeled samples associated with each cluster.

10. The system of claim 1, wherein generating the plurality of clusters of the training data comprises:

generating features based on the training data;

applying an auto-encoder to the generated features to determine a portion of the generated features; and generating the clusters of the training data based on the portion of the generated features.

11. The system of claim 10, wherein the auto-encoder comprises a neural network model in the one or more models.

12. The system of claim 10, wherein generating the plurality of clusters of the training data comprising applying a decoder to generate the clusters of the training data.

13. The system of claim 1, wherein the plurality of clusters comprises at least six clusters.

14. The system of claim 1, wherein the one or more of the plurality of unlabeled samples is applied to one or more decision trees, supervised machine learning algorithms such as Logic Regression, Support Vector Machines, Random Forest, Gradient Boosting Machines, or any other suitable machine learning models as training data to form a trained model in the one or more models.

15. The system of claim 1, wherein the one or more corresponding attributes of the training data comprises a plurality of predetermined attributes.

16. A method comprising:

obtaining, from a database, training data comprising a plurality of positively labeled samples and a plurality of unlabeled samples;

selecting, from the plurality of unlabeled samples for a respective model, one or more unsampled labels by performing a process comprising:

applying a clustering algorithm to the training data and, in response, generate as output from the clustering algorithm, a plurality of clusters of the training data based on one or more corresponding attributes of the training data, each respective cluster of the training data comprising a corresponding portion of the plurality of positively labeled samples and a corresponding portion of the plurality of unlabeled samples;

determining, for each respective cluster of the training data in the plurality of clusters of the training data, one or more corresponding distance metrics collectively defined between each sample of the corresponding portion of the plurality of positively labeled samples and each sample of the corresponding portion of the plurality of unlabeled samples;

generating, for each respective cluster of the training data, a corresponding plurality of sub-clusters based on the one or more corresponding distance metrics;

for each respective sub-cluster of the corresponding plurality of sub-clusters of each respective cluster of the training data:

generating a corresponding reward value based on a first subset of samples defined by the corresponding portion of the plurality of positively labeled samples for the respective sub-cluster and a second subset of samples defined by the corresponding portion of the plurality of unlabeled samples for the respective sub-cluster;

generating a corresponding sampling rate based on the reward value for the respective sub-cluster; and storing the corresponding reward value and the corresponding sampling rate in the database;

sampling respective sub-cluster of the corresponding plurality of sub-clusters based on the corresponding reward value and the corresponding sampling rate to select the one or more of the plurality of unlabeled samples;

storing the one or more of the plurality of unlabeled samples from each of the plurality of sub-clusters in the database accessible to one or more models, each respective model in the one or more models comprising a corresponding plurality of parameters; and training a first model in the one or more models on a first task using the one or more of the plurality of unlabeled samples from each of the plurality of sub-clusters to determine first values of the corresponding plurality of parameters to optimize performance of the first task, thereby forming a plurality of trained parameters.

17. A non-transitory computer readable medium having instructions stored thereon, wherein the instructions, when executed by at least one processor, cause a device to perform operations comprising:

obtaining, from a database, training data comprising a plurality of positively labeled samples and a plurality of unlabeled samples;

selecting, from the plurality of unlabeled samples for a respective model, one or more unsampled labels by performing a process comprising:

applying a clustering algorithm to the training data and, in response, generate as output from the clustering algorithm, a plurality of clusters of the training data based on one or more corresponding attributes of the training data, each respective cluster of the training data comprising a corresponding portion of the plurality of positively labeled samples and a corresponding portion of the plurality of unlabeled samples;

determining, for each respective cluster of the training data in the plurality of clusters of the training data, one or more corresponding distance metrics collectively defined between each sample of the corresponding portion of the plurality of positively labeled samples and each sample of the corresponding portion of the plurality of unlabeled samples;

generating, for each respective cluster of the training data, a corresponding plurality of sub-clusters based on the one or more corresponding distance metrics;

for each respective sub-cluster of the corresponding plurality of sub-clusters of each respective cluster of the training data:

generating a corresponding reward value based on a first subset of samples defined by the corresponding portion of the plurality of positively labeled samples for the respective sub-cluster and a second subset of samples defined by the corresponding portion of the plurality of unlabeled samples for the respective sub-cluster;

generating a corresponding sampling rate based on the reward value for the respective sub-cluster; and storing the corresponding reward value and the corresponding sampling rate in the database;

sampling respective sub-cluster of the corresponding plurality of sub-clusters based on the corresponding reward value and the corresponding sampling rate to select the one or more of the plurality of unlabeled samples;

storing the one or more of the plurality of unlabeled samples from each of the plurality of sub-clusters in the database accessible to one or more models, each respective model in the one or more models comprising a corresponding plurality of parameters; and training a first model in the one or more models on a first task using the one or more of the plurality of unlabeled samples from each of the plurality of sub-clusters to determine first values of the corresponding plurality of parameters to optimize performance of the first task, thereby forming a plurality of trained parameters.

* * * * *